US006647946B2

(12) United States Patent
Ohsawa et al.

(10) Patent No.: US 6,647,946 B2
(45) Date of Patent: Nov. 18, 2003

(54) WORKING MACHINE HAVING INTERNAL COMBUSTION ENGINE

(75) Inventors: Hisato Ohsawa, Fussa (JP); Katsuya Tajima, Iruma (JP)

(73) Assignee: Kioritz Corp., Tokyo (JP)

( * ) Notice: Subject to any disclaimer, the term of this patent is extended or adjusted under 35 U.S.C. 154(b) by 0 days.

(21) Appl. No.: 10/109,895

(22) Filed: Apr. 1, 2002

(65) Prior Publication Data

US 2002/0144670 A1 Oct. 10, 2002

(30) Foreign Application Priority Data

Apr. 4, 2001 (JP) ....................................... 2001-106014

(51) Int. Cl.[7] ........................ F02M 35/10; F02M 19/01; F16F 15/08

(52) U.S. Cl. ............................. 123/195 R; 123/184.61; 123/192.1

(58) Field of Search ........................ 123/184.61, 195 R, 123/195 C, 192.1, 184.31

(56) References Cited

U.S. PATENT DOCUMENTS 4,428,331 A * 1/1984 Zang et al. ............ 123/184.31
4,694,578 A * 9/1987 Kemmler ................ 123/195 R
4,788,951 A 12/1988 Nagashima ................. 123/198
4,798,182 A * 1/1989 Ebinuma et al. ........ 123/195 R
4,815,430 A * 3/1989 Ueno et al. ............. 123/195 R
4,901,681 A * 2/1990 Pozniak et al. ........ 123/184.61
4,901,691 A * 2/1990 Nagashima .............. 123/192.1
4,936,271 A * 6/1990 Nagashima et al. .... 123/195 C
6,363,618 B1 * 4/2002 Durr ...................... 123/195 R

FOREIGN PATENT DOCUMENTS

JP 59-36690 10/1984 .......... F02M/35/10
JP 2522472 10/1996 .......... F02M/19/01

* cited by examiner

*Primary Examiner*—Henry C. Yuen
*Assistant Examiner*—Jason Benton
(74) *Attorney, Agent, or Firm*—Michael D. Bednarek; Shaw Pittman LLP

(57) ABSTRACT

A carburetor is supported on a casing by the air-fuel mixture discharging port thereof and by the portion of the adjustment screws thereof. A first vibration isolating member is interposed between the casing and the air-fuel mixture discharging port, and a second vibration isolating member is interposed between the casing and the adjustment screws. These vibration preventing members prevent the direction transmission of the vibration of the casing to the carburetor side. A reasonable and compact carburetor support structure can be provided because the air-fuel mixture discharging port and the adjustment screws are intrinsically provided with the carburetor itself.

4 Claims, 3 Drawing Sheets

WORKING MACHINE HAVING INTERNAL COMBUSTION ENGINE

BACKGROUND OF THE INVENTION

1. Field of the Invention

The present invention relates to a working machine having an internal combustion engine mounted in a casing also known as self powered machines or tools, and more particularly, to a working machine in which a carburetor is supported on a casing in a vibration preventing manner.

2. Description of the Related Art

In working machines such as chain saws on which a small two-cycle internal combustion engine, for example, is mounted, a carburetor is conventionally coupled with and secured to a casing including the internal combustion engine through bolts, or the like.

With this conventional mounting arrangement, the vibration caused on the casing by the operation of the internal combustion engine is directly transmitted to the carburetor, thereby a problem arises in that an air-fuel mixture is unstably supplied to the internal combustion engine by the carburetor and that the carburetor is liable to be broken.

To cope with this problem, it is preferable that the carburetor be supported on the casing in a vibration preventing manner. In this case, however, it is preferable to further satisfy the requirements for reasonably arranging the structure of the carburetor in a compact size.

SUMMARY OF THE INVENTION

Accordingly, it is an object of the present invention, which was made in view of the foregoing circumstances, to provide a working machine having an internal combustion engine in which the carburetor has excellent vibration isolating properties on a casing and has a reasonable and compact structure.

To achieve the above object, in a working machine according to the present invention, a portion of the air-fuel mixture discharging port of a carburetor is supported on a casing through a first vibration preventing member. In addition, the adjustment screws of the carburetor are supported on the casing through a second vibration preventing member.

According to the present invention, the carburetor is supported on the casing by the air-fuel mixture discharging port and the portion of the adjustment screws. Then, the first vibration preventing member is interposed between the casing and the air-fuel mixture discharging port, and the second vibration preventing member is interposed between the casing and the adjustment screws, thereby the direct transmission of the vibration on the casing to the carburetor side can be prevented. Further, a reasonable and compact carburetor support structure can be provided because the air-fuel mixture discharging port and the adjustment screws for supporting the carburetor on the casing are intrinsically provided with the carburetor itself.

In a preferred embodiment of the present invention, the first vibration isolating member may be interposed between the air-fuel mixture discharging port and the casing to cover the outward projections that are formed to the air-fuel mixture discharging port so as to extend outward in the diameter direction of the opening of the air-fuel mixture discharging port. This arrangement is preferable because the supporting stability of the carburetor with respect to the casing side can be improved thereby.

As another embodiment of the present invention, the second vibration isolating member may act also as a seal member for sealing the outside of a carburetor chamber for accommodating the carburetor from the inside thereof in a dustproof manner. This arrangement is more preferable because the dustproof property of the carburetor chamber can be improved thereby.

As still another embodiment of the present invention, the second vibration isolating member may have guides for guiding a screw driver for rotating the adjustment screws to the heads of the adjustment screws. This arrangement is further more preferable because the screw driver securely reaches the heads of the adjustment screws by being guided by the guides and thus the adjustment screws can be smoothly and promptly rotated.

DESCRIPTION OF THE PREFERRED EMBODIMENTS

Figure 1:
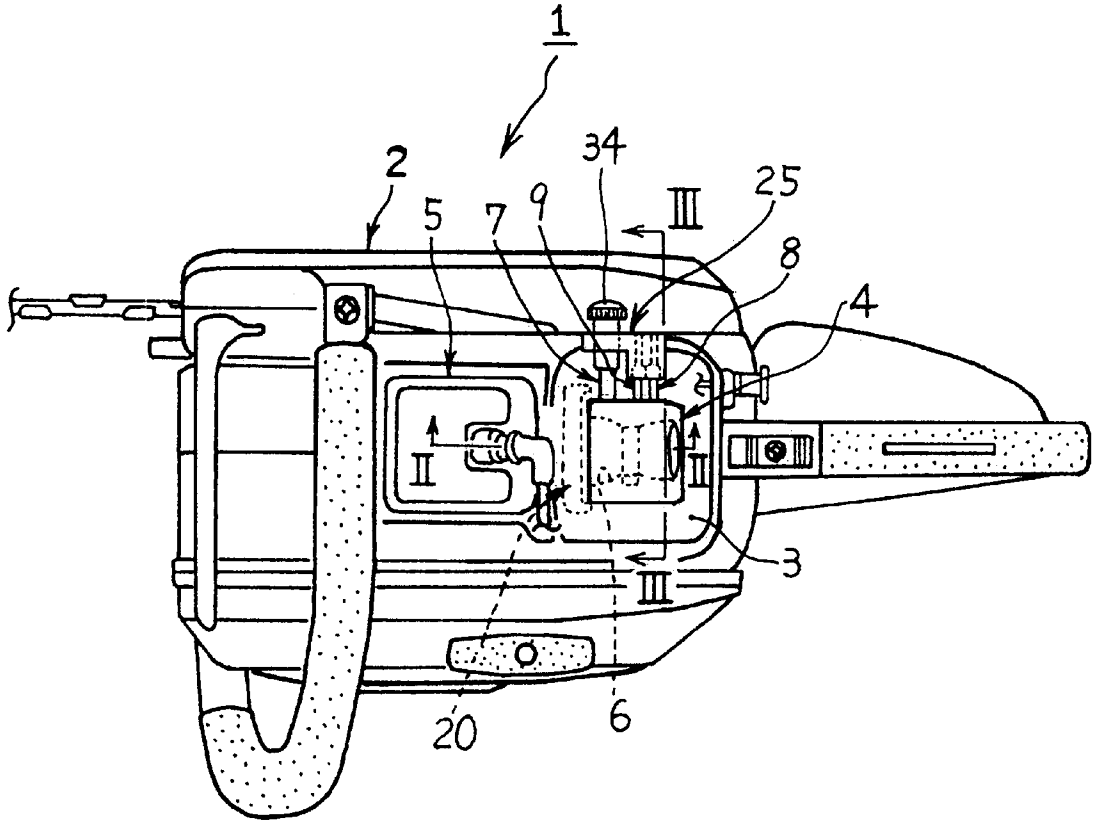
FIG. 1 is a plan view of a chain saw, from which a carburetor chamber cover and an air cleaner are removed, as an example of a working machine according to an embodiment of the present invention.

FIG. 1 shows a chain saw 1 as a working machine according to an embodiment of the present invention. The chain saw 1 has a casing 2 including a carburetor chamber 3 in which a diaphragm type carburetor 4 as an example of a carburetor is accommodated. The carburetor 4 supplies an air-fuel mixture into the crank chamber (not shown) of an air-cooled two-cycle internal combustion engine acting as a power source of the chain saw 1.

The carburetor 4 includes an air-fuel mixture discharging port 6 and adjustment screws 7, 8, and 9. In this embodiment, the carburetor 4 is supported on a casing 2 in a vibration preventing manner making use of the air-fuel mixture discharging port 6, to which a heat insulator 12 composed of a heat resistant synthetic resin, or the like is attached integrally therewith, and the portion of the adjustment screws 7, 8, and 9.

Figure 2:
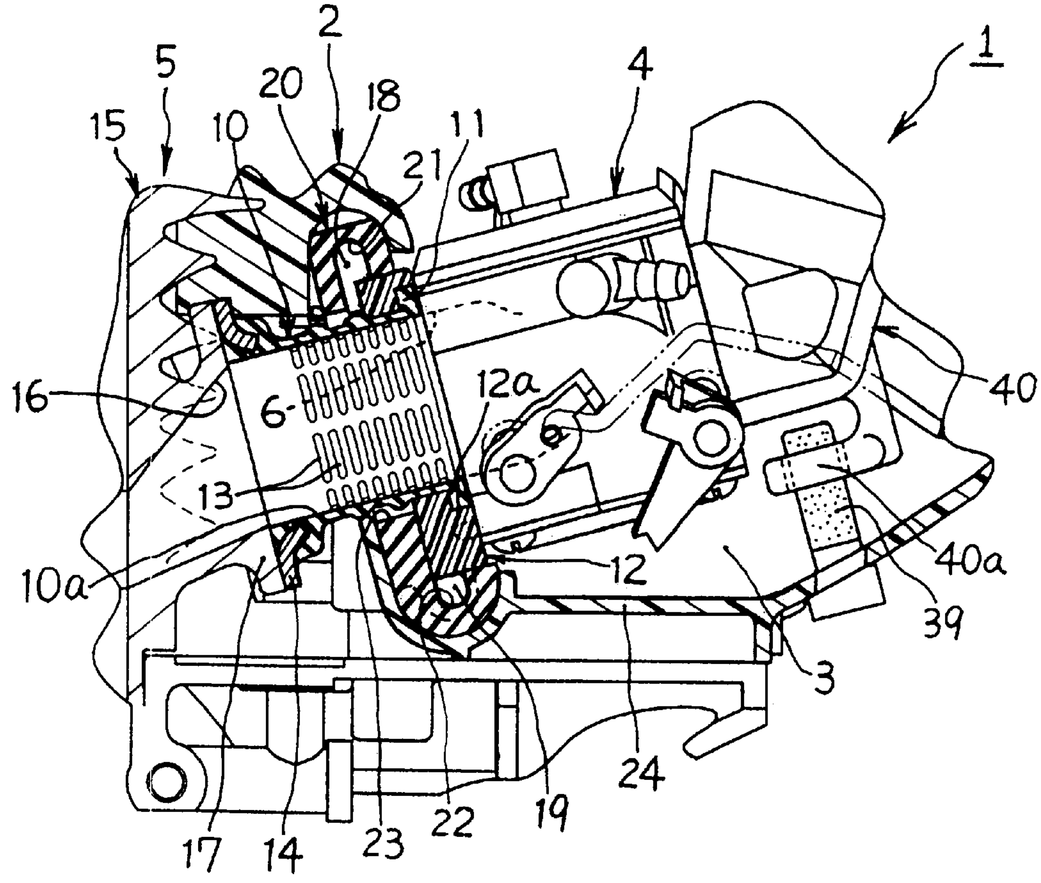
FIG. 2 is an enlarged sectional view of the chain saw taken along the line II—II of FIG. 1.

As shown in FIG. 2, a cylindrical rubber tube 10 is connected to the air-fuel mixture discharging port 6 of the carburetor 4 as an example of a flexible and heat insulating coupling member having an air-fuel mixture passage 10*a* defined in the inside thereof. The rubber tube 10 is connected to the carburetor 4 in an airtight manner such that the upstream side flange 11 of the rubber tube 10, which is formed at the end thereof on the upstream side of air-fuel mixture, is fitted into the annular recessed portion 12*a* defined around the inner peripheral surface of the heat insulator 12. A multiplicity of projecting stripes 13 are formed around the inner peripheral surface of the rubber tube 10 so as to extend in the peripheral direction thereof to securely create the air-fuel mixture.

In contrast, a downstream side metal flange 14 is attached to the end of the rubber tube 10 on the downstream side of air-fuel mixture integrally therewith. The downstream side flange 14 is joined in an airtight manner to a flange portion 17 formed around the outer periphery of the intake port 16 of a cylinder 15 forming the internal combustion engine 5.

The heat insulator 12 of the carburetor 4 has an upward projection 18 and a downward projection 19 acting as outward projections that project from the upper and lower portions thereof integrally therewith, respectively. These upward and downward projections 18 and 19 extend outward in the diametric direction of the opening of the air-fuel mixture discharging port 6. These upward and downward projections 18 and 19 are covered with a first vibration isolating member 20 composed of a material having excellent vibration absorbing property such as rubber, or the like. The first vibration isolating member 20 has engaging recesses 21 and 22 on the upper and power portions thereof that are engaged with the upward and downward projections 18 and 19, respectively. The first vibration isolating member 20 receives the rubber tube 10 through the tube insertion hole 23 defined at the center thereof and is interposed between the upward and downward projections 18 and 19 and a casing main body 24 on the casing 2 so as to reduce the vibration and heat that are transmitted from the casing 2 to the carburetor 4 side by the operation of the internal combustion engine.

In this embodiment, the air-fuel mixture discharging port 6 is supported on the casing 2 in a vibration isolating manner making use of the upward and downward projections 18 and 19 formed on the air-fuel mixture discharging port 6, thereby the carburetor 4 is preferably supported with excellent supporting stability.

Figure 3:
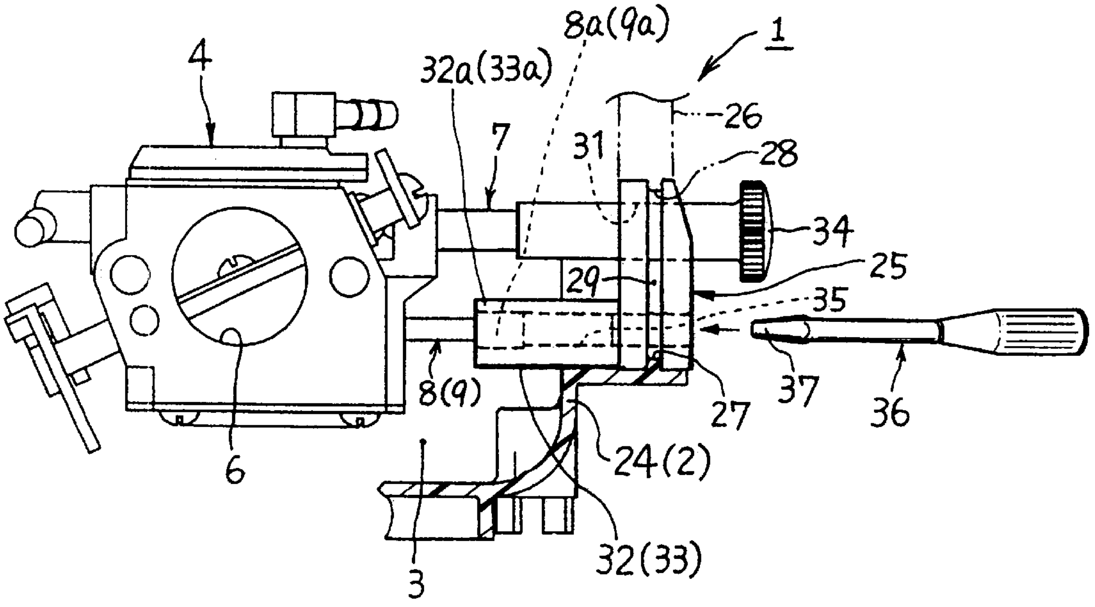
FIG. 3 is an enlarged sectional view of the chain saw taken along the line III—III of FIG. 1.

Next, a vibration isolating support structure on the adjustment screws 7, 8, and 9 side will be described below. As shown in FIGS. 1 and 3, the carburetor 4 is provided with the idle rotation adjustment screw 7, the needle valve type high speed rotation adjustment screw 8, and the similar needle valve type low speed rotation adjustment screw 9 as the adjustment screws 7, 8, and 9. In this embodiment, these adjustment screws 7, 8, and 9 extend in a lateral direction that is perpendicular to the axial direction of the air-fuel mixture discharging port 6.

As shown in FIG. 3, these respective adjustment screws 7, 8, and 9 are supported by the casing main body 24, which defines the carburetor chamber 3, together with a detachable carburetor chamber cover 26 through a second vibration isolating member 25 composed of a material having excellent vibration absorbing property such as rubber, or the like. The second vibration isolating member 25 has the groove 29 formed around the periphery thereof such that the projecting stripes 27 and 28 formed in the casing main body 24 and in the carburetor chamber cover 26, respectively are engaged with the groove 29. Thus, the second vibration isolating member 25 is held between the casing main body 24 and the carburetor chamber cover 26 as a seal member in a dustproof manner so as to prevent the invasion of dusts into the carburetor chamber 3.

In this embodiment, the second vibration isolating member 25 includes an idle rotation adjustment screw receiving hole 31, a high speed rotation adjustment screw receiving cylindrical portion 32, and a low speed rotation adjustment screw receiving cylindrical portion 33. The idle rotation adjustment screw 7 is rotatably inserted into the idle rotation adjustment screw receiving hole 31, and the knob 34 of the idle rotation adjustment screw 7 at the external end head thereof extends to the outside of the carburetor chamber 3. A worker can adjust the degree of opening of a throttle valve in idling by manually rotating the knob 34. The outer peripheral surface of the idle rotation adjustment screw 7 is in light contact with the inner peripheral surface of the idle rotation adjustment screw receiving hole 31 in a dustproof manner such that no dust invades the carburetor chamber 3 from therebetween.

In contrast, the high and low speed rotation adjustment screw receiving cylindrical portions 32 and 33 extend into the carburetor chamber 3 toward the high and low speed rotation adjustment screws 8 and 9, respectively. The head 8*a* of the high speed rotation adjustment screw 8 is rotatably inserted into the inner end 32*a* of the high speed rotation adjustment screw receiving cylindrical portion 32, and the head 9*a* of the low speed rotation adjustment screw 9 is rotatably inserted into the inner end 33*a* of the low speed rotation adjustment screw receiving cylindrical portion 33. The outer peripheral surfaces of the heads 8*a* and 9*a* of both the adjustment screws 8 and 9 are in light contact with the inner peripheral surfaces of the inner ends 32*a* and 33*a* of both the screw receiving cylindrical portions 32 and 33 such that no dust invades the carburetor chamber 3 from therebetween.

The inner peripheral surface 35 of the high speed rotation adjustment screw receiving cylindrical portion 32 communicates with the outside of the carburetor chamber 3 through the second vibration isolating member 25. Accordingly, the worker can rotate the high speed rotation adjustment screw 8 with a screw driver 36 by inserting the distal end 37 thereof into the high speed rotation adjustment screw receiving cylindrical portion 32 along the inner peripheral surface 35 thereof from the outside of the second vibration isolating member 25. At this time, the inner peripheral surface 35 of the high speed rotation adjustment screw receiving cylindrical portion 32 acts as a guide for guiding the screw driver 36 to the head 8*a* of the high speed rotation adjustment screw 8. Thus, the screw driver 36 securely reaches the head 8*a* of the high speed rotation adjustment screw 8, thereby the worker can smoothly and promptly rotate the high speed rotation adjustment screw 8. Note that the foregoing arrangement can be similarly applied to the low speed rotation adjustment screw receiving cylindrical portion 33, and the foregoing operation/working-effect can be similarly obtained therefrom.

Further, even if the idle rotation adjustment screw 7 has a short size with its head disposed in the carburetor chamber 3, similarly to the high and low speed rotation adjustment screws 8 and 9, the second vibration isolating member 25 can be provided with a screw driver guide function and a function as a dustproof seal member, similarly to the fore going case, by forming an idle rotation adjustment screw receiving cylindrical portion to the second vibration isolating member 25.

The carburetor 4 is stably supported at two positions, that is, at the air-fuel mixture discharging port 6 and at the portion of the adjustment screws 7, 8, and 9 through the first and second vibration isolating members 20 and 25. However, as shown in FIG. 2, this embodiment intends to further enhance vibration isolating supporting stability by preventing the vibration of the carburetor 4 on the side thereof opposite to the air-fuel mixture discharging port 6. That is, a ring-shaped portion 40*a* acting as a supported member is formed to an air cleaner mounting elbow pipe 40 integrally therewith that is attached to the carburetor 4 on the side thereof opposite to the air-fuel mixture discharging port 6. Then, a rod-shaped vibration isolating member 39, which is composed of rubber, or the like, acts as a third vibration isolating member, and is attached to the casing main body 24 on the casing 2, is loosely inserted into the ring-shaped portion 40*a*, thereby the overall carburetor 4 is supported in good balance with respect to the casing 2.

What is claimed is:

1. A working machine having an internal combustion engine mounted in a casing, comprising:

a first vibration isolating member through which a portion of the air-fuel mixture discharging port of a carburetor is supported on the casing; and a second vibration isolating member through which the adjustment screws of the carburetor are supported on the casing.

2. A working machine according to claim 1, wherein the first vibration isolating member is interposed between the air-fuel mixture discharging port and the casing to cover the outward projections that are formed to the air-fuel mixture discharging port so as to extend outward in the diameter direction of the opening of the air-fuel mixture discharging port.

3. A working machine according to claim 1, wherein the second vibration isolating member acts also as a seal member for sealing the outside of a carburetor chamber for accommodating the carburetor from the inside thereof in a dustproof manner.

4. A working machine according to claim 1, wherein the second vibration isolating member has guides for guiding a screw driver for rotating adjustment screws of the carburetor to the heads of the adjustment screws.

* * * * *